United States Patent
Gandluri et al.

(10) Patent No.: US 11,940,886 B2
(45) Date of Patent: Mar. 26, 2024

(54) AUTOMATICALLY PREDICTING FAIL-OVER OF MESSAGE-ORIENTED MIDDLEWARE SYSTEMS

(71) Applicant: Dell Products L.P., Round Rock, TX (US)

(72) Inventors: Madhanamohana Reddy Gandluri, Andrapradesh (IN); Sheik Saleem, Hyderabad (IN); Bijan Kumar Mohanty, Austin, TX (US); Hung T. Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 17/579,058

(22) Filed: Jan. 19, 2022

(65) Prior Publication Data

US 2023/0229574 A1     Jul. 20, 2023

(51) Int. Cl.
    *G06F 11/20*     (2006.01)
(52) U.S. Cl.
    CPC ........ *G06F 11/203* (2013.01); *G06F 2201/85* (2013.01)
(58) Field of Classification Search
    CPC .. G06F 11/203; G06F 11/202; G06F 11/2023; G06F 11/2028; G06F 11/3447; G06F 11/3452; G06F 11/3495; G06F 11/3466; H04L 41/0663
See application file for complete search history.

(56) References Cited

U.S. PATENT DOCUMENTS

| | | | |
|---|---|---|---|
| 6,947,957 B1 * | 9/2005 | Lange | G06F 11/079 |
| | | | 714/48 |
| 7,246,256 B2 | 7/2007 | De La Cruz et al. | |
| 7,512,668 B2 | 3/2009 | Koegel | |
| 7,634,683 B2 | 12/2009 | De La Cruz et al. | |
| 10,313,282 B1 | 6/2019 | Canady et al. | |
| 10,896,077 B2 | 1/2021 | Dinh et al. | |

(Continued)

OTHER PUBLICATIONS

Wikipedia, "Message-Oriented Middleware", 2021 (Year: 2021).*
Wikipedia, "Isolation Forest", 2020 (Year: 2020).*

*Primary Examiner* — Gabriel Chu
(74) *Attorney, Agent, or Firm* — Ryan, Mason & Lewis, LLP

(57) ABSTRACT

Methods, apparatus, and processor-readable storage media for automatically predicting fail-over of message-oriented middleware systems are provided herein. An example computer-implemented method includes obtaining one or more message-oriented middleware parameter values for at least a portion of multiple message-oriented middleware systems; detecting one or more fail-over-related anomalies associated with at least one of the multiple message-oriented middleware systems by processing at least a portion of the one or more message-oriented middleware parameter values using one or more machine learning techniques; and automatically migrating, based at least in part on the one or more detected fail-over-related anomalies, at least a portion of data associated with the at least one message-oriented middleware system associated with the one or more detected fail-over-related anomalies to at least one of the other of the multiple message-oriented middleware systems.

20 Claims, 7 Drawing Sheets

(56) References Cited

U.S. PATENT DOCUMENTS

| | | | |
|---|---|---|---|
| 2010/0023577 A1* | 1/2010 | Vijaykumar | G06F 9/542 |
| | | | 709/202 |
| 2017/0054605 A1* | 2/2017 | Duncan | H04L 41/145 |
| 2017/0118092 A1* | 4/2017 | Dixon | H04L 41/069 |
| 2018/0324199 A1* | 11/2018 | Crotinger | G06F 16/285 |
| 2020/0053004 A1 | 2/2020 | Nambiar et al. | |
| 2020/0319982 A1 | 10/2020 | Rusev et al. | |
| 2020/0364607 A1* | 11/2020 | BahenaTapia | G06N 7/01 |
| 2022/0318118 A1* | 10/2022 | Adamson | G06F 11/3419 |
| 2022/0376970 A1* | 11/2022 | Chawathe | G06F 11/3452 |
| 2023/0010417 A1* | 1/2023 | Mishra | G06F 9/546 |

* cited by examiner

FIG. 3

```
import numpy as np
import panda as pd
import seaborn as sns
from sklearn.ensemble import IsolationForest
import matplotlib.pyplot as plt
from sklearn.model_selection import train_test_split data = pd.read_csv('../data/MOMParameter.csv')

data = data.drop(['Time'] , axis=1)

outliers = data.loc[data['Pattern']==1]
normal = data.loc[data['Pattern']==0]

outliers = outliers.drop(['Pattern'] , axis=1)
normal = normal.drop(['Pattern'] , axis=1)

X_train = np.array(normal.iloc[0:142403,:])
X_test = np.array(outliers)

#Isolation Forest model is created with the hyperparameters
max_features=1.0
n_estimators=50
max_samples='auto'
contamination=float(0.2)
forest_model=IsolationForest(max_features = max_features,
                n_estimators=n_estimators, max_samples=max_samples,
                contamination=contamination)

forest_model.fit(X_train)
```

FIG. 5

```
public void momConnectQ(String host1, String qMgrName1, String channel1, String queueName1, int port1, boolean switchflg,
                        String host2, String qMgrName2, String channel2, String queueName2, int port2) throws
MQException {
    try
    {
        if (switchflg){
            momSetProperties(host1,qMgrName1,channel1,queueName1, port1);
            momBrowseFirstMsg(qMgr1, qMgrName1, localQueue, queueName1);
        } else {
            momSetProperties(host2,qMgrName2,channel2,queueName2, port2);
            momBrowseFirstMsg(qMgr2, qMgrName2, localQueue, queueName2);
        }
    } catch (MQException ex) {
        System.out.println(
            "An MQSeries error occurred mqConnectQ : Completion code"
            + ex.completionCode
            + " Reason code "
            + ex.reasonCode);
    } catch (Exception e) {
        System.out.println("An unknown exception occured mqConnectQ :" + e.toString());
    }
}
```
⌐ 500

AUTOMATICALLY PREDICTING FAIL-OVER OF MESSAGE-ORIENTED MIDDLEWARE SYSTEMS

FIELD

The field relates generally to information processing systems, and more particularly to techniques for providing data continuity using such systems.

BACKGROUND

Consistent message delivery is important to most information technology (IT) system operations, and such systems commonly use message-oriented middleware (MOM) products in connection with this task. However, conventional message management approaches, in connection with fail-over during active persistent transaction operations, are unable to maintain data such as transaction state information, message offsets to logged data space of actively-connected clients (e.g., publishers and consumers) between clusters, etc. Accordingly, in such scenarios, when the MOM clients switch from one cluster to another cluster, the clients typically need to re-process the same messages from the beginning, which results in duplicity that negatively impacts scalability and operation management.

SUMMARY

Illustrative embodiments of the disclosure provide techniques for automatically predicting fail-over of message-oriented middleware systems. An exemplary computer-implemented method includes obtaining one or more message-oriented middleware parameter values for at least a portion of multiple message-oriented middleware systems, and detecting one or more fail-over-related anomalies associated with at least one of the multiple message-oriented middleware systems by processing at least a portion of the one or more message-oriented middleware parameter values using one or more machine learning techniques. The method also includes automatically migrating, based at least in part on the one or more detected fail-over-related anomalies, at least a portion of data associated with the at least one message-oriented middleware system associated with the one or more detected fail-over-related anomalies to at least one of the other of the multiple message-oriented middleware systems.

Illustrative embodiments can provide significant advantages relative to conventional message management approaches. For example, problems associated with data duplicity are overcome in one or more embodiments through automatically migrating data associated with a message-oriented middleware system in response to detection of one or more fail-over-related anomalies in the message-oriented middleware system.

These and other illustrative embodiments described herein include, without limitation, methods, apparatus, systems, and computer program products comprising processor-readable storage media.

BRIEF DESCRIPTION OF THE DRAWINGS

FIG. 3 shows an example code snippet for implementing at least a portion of a machine learning-based MOM cluster anomaly detection model in an illustrative embodiment.

FIG. 5 shows an example code snippet for implementing fail-over-based MOM transitioning in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
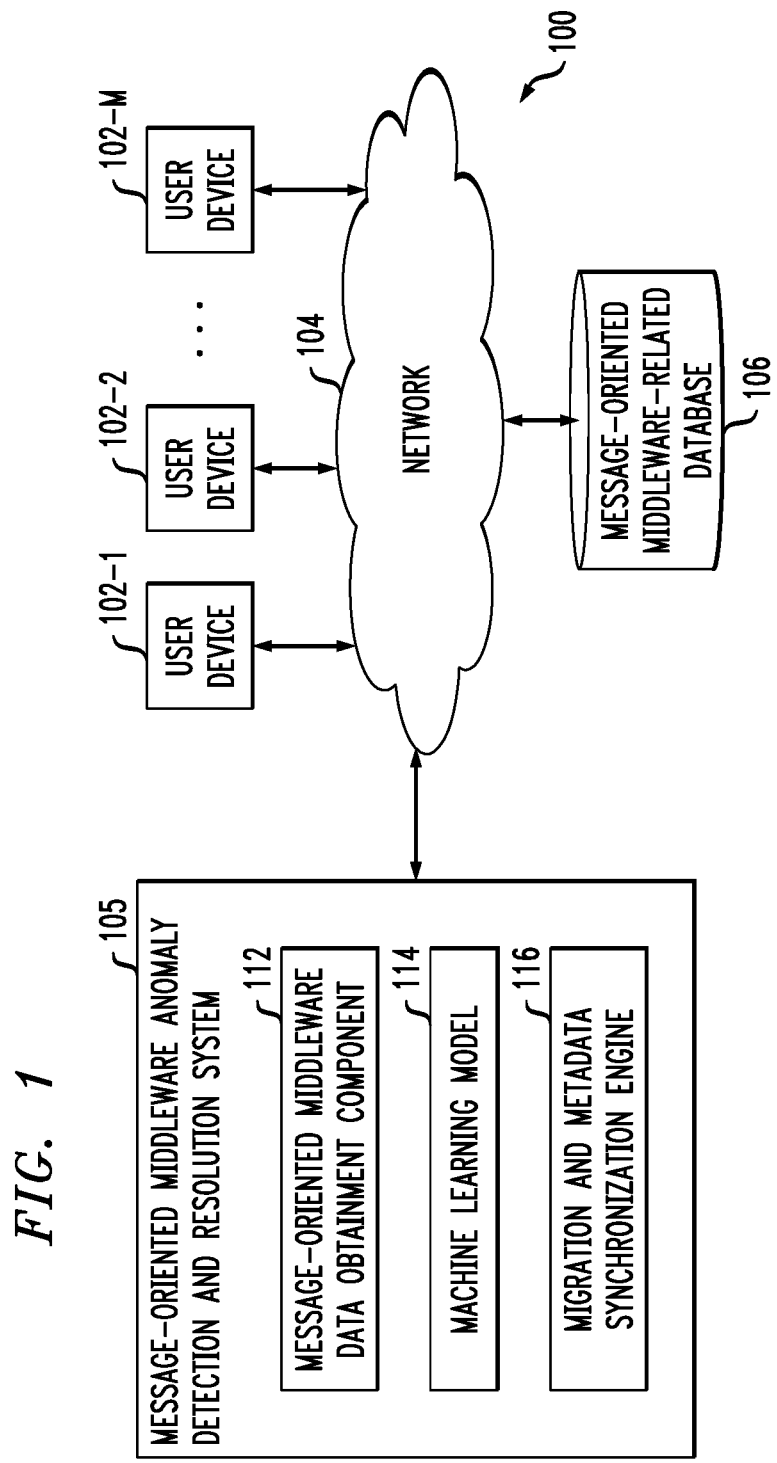
FIG. 1 shows an information processing system configured for automatically predicting fail-over of message-oriented middleware systems in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is message-oriented middleware anomaly detection and resolution system 105.

The user devices 102 may comprise, for example, mobile telephones, laptop computers, tablet computers, desktop computers or other types of computing devices that comprise and/or are associated with one or more message-oriented middleware systems. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, message-oriented middleware anomaly detection and resolution system 105 can have an associated message-oriented middleware-related database 106 configured to store data pertaining to various message-oriented middleware systems, which comprise, for example, parameter data, metadata, fail-over data, etc.

The message-oriented middleware-related database 106 in the present embodiment is implemented using one or more storage systems associated with message-oriented middleware anomaly detection and resolution system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with message-oriented middleware anomaly detection and resolution system 105 are one or more input-output devices, which illustratively comprise keyboards, displays or other types of input-output devices in any combination. Such input-output devices can be used, for example, to support one or more user interfaces to message-oriented middleware anomaly detection and resolution system 105, as well as to support communication between message-oriented middleware anomaly detection and resolution system 105 and other related systems and devices not explicitly shown.

Additionally, message-oriented middleware anomaly detection and resolution system 105 in the FIG. 1 embodiment is assumed to be implemented using at least one processing device. Each such processing device generally comprises at least one processor and an associated memory, and implements one or more functional modules for controlling certain features of message-oriented middleware anomaly detection and resolution system 105.

More particularly, message-oriented middleware anomaly detection and resolution system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows message-oriented middleware anomaly detection and resolution system 105 to communicate over the network 104 with the user devices 102, and illustratively comprises one or more conventional transceivers.

The message-oriented middleware anomaly detection and resolution system 105 further comprises message-oriented middleware data obtainment component 112, machine learning model 114, and migration and metadata synchronization engine 116.

It is to be appreciated that this particular arrangement of elements 112, 114 and 116 illustrated in the message-oriented middleware anomaly detection and resolution system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically predicting fail-over of message-oriented middleware systems involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, message-oriented middleware anomaly detection and resolution system 105 and message-oriented middleware-related database 106 can be on and/or part of the same processing platform.

An exemplary process utilizing elements 112, 114 and 116 of an example message-oriented middleware anomaly detection and resolution system 105 in computer network 100 will be described in more detail with reference to the flow diagram of FIG. 6.

Accordingly, at least one embodiment includes automatically predicting fail-over of MOM systems. As further detailed herein, such an embodiment can include generating and/or implementing a SMDRF which synchronizes different MOM clusters. As used herein, a MOM cluster refers to a network of queue managers that are logically associated in some way. Queue managers can be grouped in a cluster, for example, such that queue managers can make the queues that they host available to every other queue manager in the cluster. Any queue manager can send a message to any other queue manager in the same cluster without the need for many explicit peer-to-peer definitions between source and target. Also, every queue manager in a cluster can have a single transmission queue that transmits messages to any other queue manager in the cluster, and each queue manager needs to define only one cluster-receiver channel and one cluster-sender channel.

SMDRF enables MOM clients to fail-over to any synchronized cluster, wherein such clients will continue their processing from where they left off (at their previous cluster) without duplicity and/or rework. Additionally, in one or more embodiments, such topology can be applied to multiple MOMs to render a consistent quality of service (QoS) for all messages associated with a given environment and/or enterprise.

As further detailed herein, at least one embodiment includes providing a proactive and predictive fail-over of one or more MOM systems, irrespective of MOM type. Such an embodiment includes predicting at least one upcoming outage based at least in part on advanced anomaly detection of the MOM system(s) based on the values of one or more parameters and/or attributes thereof as well as that of the infrastructure on which the MOM system(s) is/are hosted.

Additionally, one or more embodiments include migrating at least one (primary) MOM cluster and/or server to at least one fail-over cluster and/or server with all of the corresponding state information correctly transferred such that the transactional integrity, message delivery guarantee, and quality of service is maintained. In such an embodiment, the fail-over migration includes implementing a trigger mechanism to synchronize metadata between clusters, for example, after an upcoming failure of the primary cluster has been predicted (such as noted above and further described herein). By leveraging machine learning techniques for anomaly detection, at least one embodiment includes monitoring various system parameters including one or more MOM metrics, and by measuring normal parameter values, such an embodiment can include detecting at least one anomaly when at least one parameter value deviates from the normal values. Based at least in part on such an anomaly detection, an automated decision can be made and/or an automated action can be taken to migrate from the primary cluster to a secondary cluster before an anomaly-related outage of the primary cluster occurs. Further, with such a migration, messages can flow through the secondary cluster uninterrupted, maintaining operational and/or transaction continuity.

Figure 2:
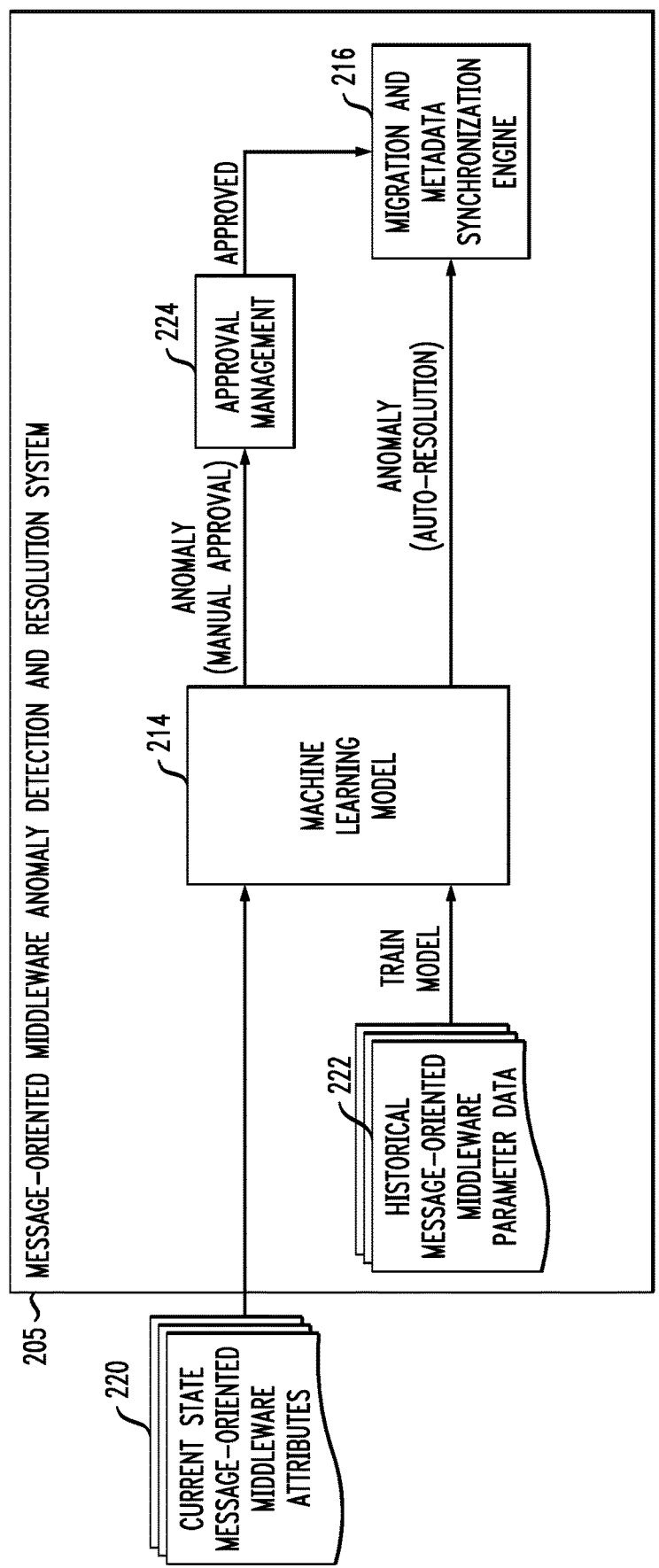
FIG. 2 shows example architecture of a MOM anomaly detection and resolution system in an illustrative embodiment.

FIG. 2 shows example architecture of a MOM anomaly detection and resolution system 205 in an illustrative embodiment. By way of illustration, FIG. 2 depicts current state MOM attributes 220, which are provided to and/or obtained by MOM anomaly detection and resolution system 205 and processed by machine learning model 214 to predict one or anomalies associated with one or more given MOM systems. Machine learning model 214, in this example embodiment, is trained using historical MOM parameter data 222. As also depicted by FIG. 2, the one or more anomalies predicted by machine learning model 214 can be sent to approval management 224 for manual approval (which, after approval, provides the one or more predicted anomalies to migration and metadata synchronization engine 216 for process) and/or directly to migration and metadata synchronization engine 216 for auto-resolution.

As noted above and further detailed herein, one or more embodiments includes MOM platform anomaly detection and/or prediction. Such an embodiment includes generating and/or implementing a proactive approach to middleware outages to reduce and/or minimize the impact in message delivery and operational efforts to maintain enterprise continuity. This approach includes leveraging an unsupervised learning approach and one or more machine learning models to detect one or more anomalies in MOM systems and/or predict outages in the MOM systems. By predicting an upcoming outage before it has occurred, such an embodiment can include enabling actions in connection with proactively migrating messages to a different cluster, thus eliminating outage-related issues and providing self-healing capabilities in messaging systems.

Anomaly detection and/or outlier detection includes identifying a situation that is not considered normal based at least in part on the observation of one or more properties being considered. By way of example, messaging systems typically include a list of attributes or parameters that indicate the condition or state of the corresponding message-oriented middleware platform(s). Such attributes can include infrastructure parameters such as central processing unit (CPU) utilization, memory utilization, storage utilization, input/output (I/O) utilization, etc., as well as messaging platform parameters such as queue depth, channel agent values, channel connection agent values, etc. Any deviations from normal value ranges can be considered an outlier and/or anomaly, and in accordance with one or more embodiments, such a deviation can serve as a basis for a decision on migrating data to at least one fail-over cluster.

One or more embodiments include multivariate anomaly detection implemented using at least one isolation forest algorithm, which does not need labeled training data. Alternatively, at least one embodiment can include multivariate anomaly detection implemented using one or more supervised learning techniques and/or one or more neural networks. An isolation forest algorithm includes the capacity to scale-up to handle large data sizes and high-dimensional problems with a large number of attributes, some of which may be irrelevant and potential noise. Additionally, an isolation forest algorithm isolates a given anomaly by creating decision trees over random attributes. This random partitioning produces short paths because, for example, fewer instances of anomalies result in smaller partitions, and distinguishable attribute values are more likely to be separated in early partitioning. Accordingly, when a forest (group) of random trees collectively produces shorter path lengths for some particular points, the points are likely to represent anomalies.

In at least one embodiment, a larger number of splits are required to isolate a normal point, while an anomaly can be isolated by a smaller number of splits. As such, the number of splits can be used in part to determine the level at which the isolation occurred and to generate an anomaly score. The process can be repeated multiple times and the isolation level of each point can be noted. Once the iterations are completed, the anomaly score of each point and/or instance suggests the likeliness of an anomaly. In one or more embodiments, the anomaly score is a function of the average level at which the point is isolated. Additionally, in such an embodiment, a given number of points and/or instances (e.g., the top k points and/or instances) identified on the basis of anomaly score are labeled as anomalies.

In one or more embodiments, MOM parameters and infrastructure resource values are periodically collected and input to an anomaly detection engine. An isolation forest model, as part of the anomaly detection engine, is trained using historical pattern data and the above-noted input is processed using the trained isolation forest model. If the model determines that one or more the parameter values deviate from the typical values, the model raises the state of the given MOM as an anomaly and/or outlier. This state of the MOM can, in at least one embodiment, automatically trigger a data migration step, as further detailed herein.

FIG. 3 shows an example code snippet for implementing at least a portion of a machine learning-based MOM cluster anomaly detection model in an illustrative embodiment. In this embodiment, example code snippet 300 is executed by or under the control of at least one processing system and/or device. For example, the example code snippet 300 may be viewed as comprising a portion of a software implementation of at least part of message-oriented middleware anomaly detection and resolution system 105 of the FIG. 1 embodiment.

The example code snippet 300 illustrates an isolation forest model trained using historical pattern data, wherein such information is used for prediction(s). If the model identifies the parameter values deviate from the typical values, the model raises the state as an anomaly or outlier.

It is to be appreciated that this particular example code snippet shows just one example implementation of a portion of a machine learning-based MOM cluster anomaly detection model, and alternative implementations of the process can be used in other embodiments.

As detailed herein, one or more embodiments include automated fail-over cluster migration with metadata synchronization. In such an embodiment, a SMDRF synchronizes MOM clusters for MOM clients' applications to preclude message duplicity. SMDRF processes metadata, which hold client information, broadcasts the updated metadata to all relevant clusters, and locally updates the clusters as depicted, for example, in FIG. 4.

Figure 4:
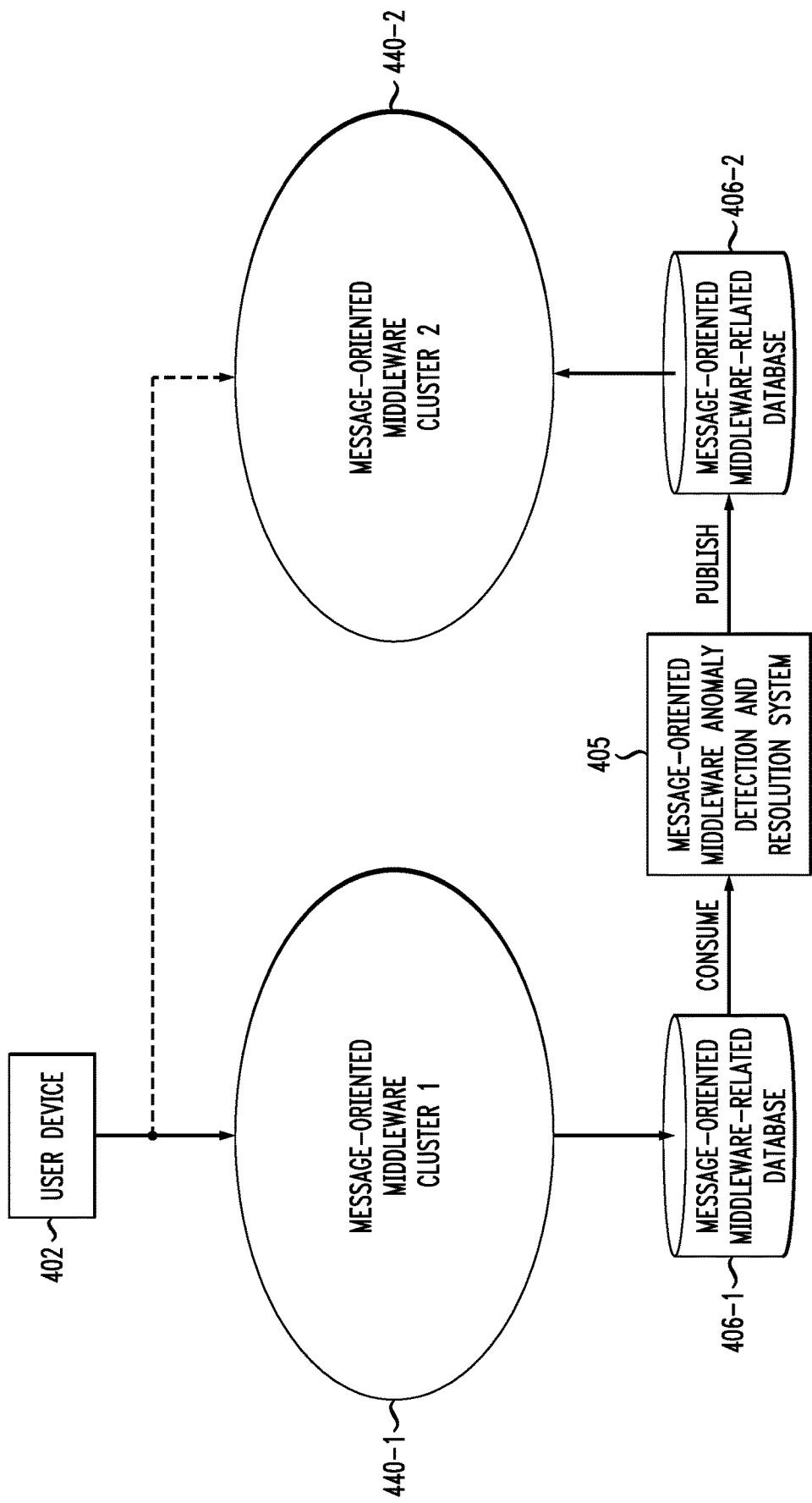
FIG. 4 shows example smart messaging-disaster recovery framework (SMDRF) architecture in an illustrative embodiment.

FIG. 4 shows example SMDRF architecture in an illustrative embodiment. By way of illustration, FIG. 4 depicts synchronizing MOM clusters (e.g., MOM cluster 440-1 and MOM cluster 440-2) for MOM clients' applications embodied within user device 402 to produce scalable and active-active clustering. When an anomaly is detected, MOM cluster 440-1 can quickly failover to MOM cluster 440-2 seamlessly without worrying about message duplicity and re-connectivity. Message-oriented middleware-related database 406-1 will process metadata which holds client information, and also analyze the metadata and broadcast updated metadata to all relevant clusters via MOM anomaly detection and resolution system 405 and message-oriented middleware-related database 406-2, thereby updating the clusters.

Additionally, in one or more embodiments, various individual classes are utilized to implement an SMDRF architecture (such as depicted, for example, in FIG. 4). Classes used to implement an example SMDRF architecture can include, for instance, an enterprise message-oriented middleware smart cluster sync (EMOMSCS) class, one or more source classes, one or more destination classes, a publisher class, a listener class, an MDComparator class, an updater class, a translator class, and an MDStoreCoreAPI class. More specifically, an EMOMSCS class represents a base class which is triggered once the EMOMSCS services (e.g., controller services which manage one or more interfaces in the given product) are started. Source classes represent end points which connect to and store respective source MOM metadata for further operations. Destination classes represent end points which connect to and store respective destination MOM metadata for further operations. In one or more embodiments, source and destinations classes are extendable and versatile based on the MOM product(s).

Additionally, a publisher class publishes metadata change events to at least one metadata store, and a listener class consumes metadata change events from at least one metadata store. An MDComparator class compares incoming metadata with destination metadata and triggers any update required at the destination (e.g., at a destination metadata store) using an updater class. A translator class translates metadata from one source to another, and an MDStore-CoreAPI class provides one or more application programming interfaces (APIs) for clients to update metadata and/or obtain updated metadata to use while switching between clusters and/or different MOM products.

Also, in at least one embodiment, if a global traffic manager (GTM) and/or a local traffic manager (LTM) fails to switch due to one or more errors (e.g., F5 errors), then a MOMSwitch Java class is automatically triggered to provides a method for applications to switch and automatically resume processing in case of fail-over between active and standby MOM servers. At least a portion of such an embodiment is illustrated via the example code snippet depicted in FIG. 5.

FIG. 5 shows an example code snippet for implementing fail-over-based MOM transitioning in an illustrative embodiment. In this embodiment, example code snippet 500 is executed by or under the control of at least one processing system and/or device. For example, the example code snippet 500 may be viewed as comprising a portion of a software implementation of at least part of message-oriented middleware anomaly detection and resolution system 105 of the FIG. 1 embodiment.

The example code snippet 500 illustrates utilizing momConnect, a method for a client application to connect to a first MOM cluster or a second MOM cluster, depending on if the switchflg is true or false. If it is true, the client application will connect to the first MOM cluster, passing a specific set of connection parameters. This is to ensure that the connection is seamless via the underlying momConnect method.

It is to be appreciated that this particular example code snippet shows just one example of implementing fail-over-based MOM transitioning, and alternative implementations of the process can be used in other embodiments.

In one or more embodiments, fail-over cluster migration with metadata synchronization can be carried out in connection with multiple contexts and/or scenarios. For example, such scenarios can include message duplicity, re-connectivity, and two-phase commit XA transaction coordination while clusters are using local storage. In such a scenario, each client consumer state for any transaction's metadata can include, for example, current message offset, last message read, last message committed, last read timestamp, last committed timestamp, topic attributes, transaction-identifier (ID) of pending two-phase commit message, etc. Metadata are written to at least one current cluster memory cache, and subsequently to persistent storage. Additionally, metadata can dictate where to resume processing in case of a migration to another (secondary) cluster in connection with, for example, one of the above-noted scenarios. Metadata are typically cluster-specific, and another (secondary) cluster may not contain a given (primary) cluster's metadata entirely if storage synchronization replication fails (such as detailed above with conventional approaches). With conventional asynchronous replication, there may be discrepancies in real-time because the system is not writing to both places at once, while conventional synchronous replication requires more resources and may introduce latency to an application.

Using such conventional approaches, during a consumer fail-over, due to updated metadata operations, missing fresh metadata from a first (primary) cluster can be built on the other (secondary) cluster, potentially causing the consumer to restart message processing from the beginning. For example, consider a scenario wherein a consumer is processing a batch of 100 persistent messages, and at the $20^{th}$ message, a GTM fail-over occurs because of system problems which caused the listener port to drop. In such an example scenario, the metadata of the other (secondary) cluster lacks the information of the already committed messages offset to the logged space, so message processing is started again from the beginning (i.e., the first message).

As also detailed herein, one or more embodiments can include implementing and/or using a messaging disaster recovery tool (MDRT). As further detailed herein, an MDRT can be generated and/or implemented in one or more embodiments, and can include components including at least one monitoring component, at least one collector component, at least one notifier component, and at least one orchestrator component.

In such an embodiment, a monitoring component collects platform load balancer (LB) information from at least one inventory and analyzes traffic changes from one cluster to one or more other clusters. A monitoring component also sends a notification (e.g., e-mail) to one or more users if a fail-over occurred, and informs the orchestrator component for further action by providing load balancing details. Also, in such an embodiment, a collector component identifies active and passive cluster information, generates metadata from active clusters and synchronizes such metadata with non-active clusters. Also, a collector component can encrypt the metadata and upload the same to object storage. Further, a collector component can send failure information to one or more users (e.g., notifications pertaining to a failed import, a failed export, etc.).

In at least one embodiment, a notifier component can include a simple mail transfer protocol (SMTP) service which collects notification type information and content from orchestrator components, monitoring components, and/or collector components, and triggers notifications (e.g., one or more emails) based at least in part thereon. Further, in one or more embodiments, an orchestrator component controls and manages a MDRT workflow, and performs one or more automated actions in response to one or more anomaly predictions (generated such as detailed herein).

By way of illustration, consider an example embodiment in which an MDRT functions upon observing and/or processing a fail-over. For example, such an embodiment can include sending a notification (e.g., an email notification) to one or more relevant users about the fail-over, and searching for a non-domain controller (DC) if one is available to obtain metadata. If yes (i.e., a non-DC is available to obtain metadata), the MDRT collector will generate metadata and synchronize such metadata. If no (i.e., a non-DC is not available to obtain metadata), the MDRT collector will obtain metadata from at least one upload to an active DC. Also, in one or more embodiments, backlog data can be moved from a non-active DC to an active DC, if one exists.

Accordingly, an SMDRF such as detailed in connection with one or more embodiments removes manual processes for fail-over in DC maintenance, and the framework can perform end-to-end synchronization at any point of time.

As such, one or more embodiments include generating and/or utilizing synchronization logs and processes, wherein an SMDRF includes a logging mechanism for audit purpose, and is able to generate metadata and sync with other DCs as each of multiple clusters will have dedicated threads to handle. Based at least in part on an error code, a notification to one or more users can be triggered, wherein such a notification indicates information about the failure and/or error.

Also, at least one embodiment includes implementing a metadata backup, wherein an SMDRF generates metadata, for example, in JavaScript Object Notation (JSON) format, generates a key for encryption, and uploads the metadata to object storage after encryption. In such an embodiment, cluster metadata generation and uploading to object storage can be carried out efficiently, as such processes can be carried out with multiple threads.

Further, one or more embodiments include generating a notification when the SMDRF observes a fail-over. In such an embodiment, the SMDRF maintains current load balancing pointers in a database, and if the SMDRF observes any changes in the current state, the SMDRF will attempt (e.g., three times within two minutes) to confirm the fail-over, trigger the notification, and update the current state of LB. Along with the notification, the SMDRF can create threads (e.g., re-sync metadata, upload polices, health check, etc.) to make other DCs fully functional.

At least one embodiment can also include generating and/or utilizing an SMDRF LB verification table, which can include a web console used while DC maintenance activates, and which provides visibility as to where LBs are pointing. Further, one or more embodiments include using SMDRF move data. In such an embodiment, an SMDRF wakes-up a move data tool by providing active and passive cluster information, and move data tool will verify the availability of at least one passive DC. If available, such an embodiment includes verifying the backlog data in each queue and enabling at least one queue-based thread to move data (e.g., each thread creates a dynamic channel to carry messages from passive to active, continuing until the queues are emptied by internal looping, and generating a notification if such actions fail). If not available, such an embodiment includes selecting at least one recent backup from object storage, decrypt the backup and uploading the data to the given cluster (and generating a notification if such actions fail).

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 6:
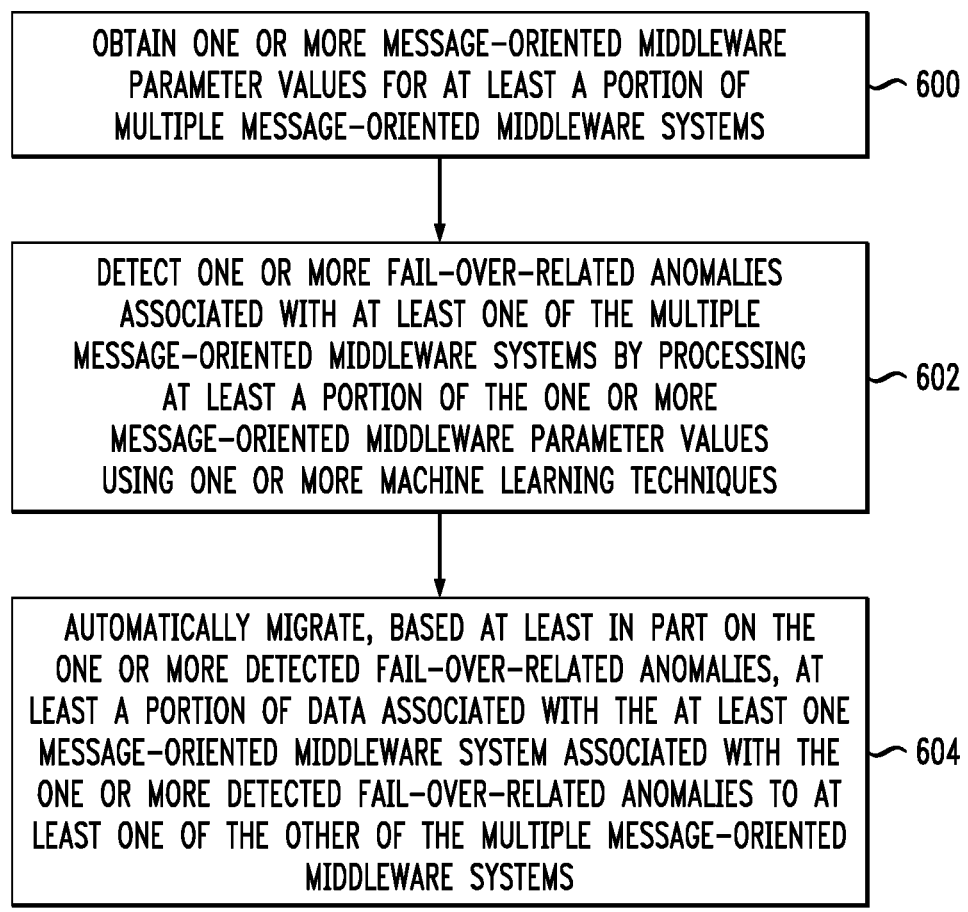
FIG. 6 is a flow diagram of a process for automatically predicting fail-over of message-oriented middleware systems in an illustrative embodiment.

FIG. 6 is a flow diagram of a process for automatically predicting fail-over of message-oriented middleware systems in an illustrative embodiment. It is to be understood that this particular process is only an example, and additional or alternative processes can be carried out in other embodiments.

In this embodiment, the process includes steps 600 through 604. These steps are assumed to be performed by the message-oriented middleware anomaly detection and resolution system 105 utilizing elements 112, 114 and 116.

Step 600 includes obtaining one or more message-oriented middleware parameter values for at least a portion of multiple message-oriented middleware systems. In one or more embodiments, obtaining one or more message-oriented middleware parameter values includes obtaining values pertaining to at least one of central processing unit utilization, memory utilization, storage utilization, input/output utilization, queue depth, channel agent information, and channel connection agent information.

Step 602 includes detecting one or more fail-over-related anomalies associated with at least one of the multiple message-oriented middleware systems by processing at least a portion of the one or more message-oriented middleware parameter values using one or more machine learning techniques. In at least one embodiment, processing at least a portion of the one or more message-oriented middleware parameter values includes processing at least a portion of the one or more message-oriented middleware parameter values using at least one isolation forest algorithm. Also, in one or more embodiment, detecting one or more fail-over-related anomalies associated with at least one of the multiple message-oriented middleware systems includes predicting at least one fail-over event for the at least one message-oriented middleware system based at least in part on results of processing the at least a portion of the one or more message-oriented middleware parameter values one or more using machine learning techniques.

Additionally or alternatively, detecting one or more fail-over-related anomalies associated with at least one of the multiple message-oriented middleware systems can include processing one or more data values derived from at least one infrastructure upon which at least a portion of the multiple message-oriented middleware systems is hosted.

Step 604 includes automatically migrating, based at least in part on the one or more detected fail-over-related anomalies, at least a portion of data associated with the at least one message-oriented middleware system associated with the one or more detected fail-over-related anomalies to at least one of the other of the multiple message-oriented middleware systems. In one or more embodiments, automatically migrating at least a portion of data includes synchronizing one or more items of metadata from the at least one message-oriented middleware system associated with the one or more detected fail-over-related anomalies to the at least one of the other of the multiple message-oriented middleware systems.

Additionally, the techniques depicted in FIG. 6 can also include processing historical values for the one or more message-oriented middleware parameter values. In such an embodiment, detecting one or more fail-over-related anomalies associated with at least one of the multiple message-oriented middleware systems includes comparing at least a portion of the one or more obtained message-oriented middleware parameter values to the processed historical values for the one or more message-oriented middleware parameter values.

Further, the techniques depicted in FIG. 6 can also include automatically identifying, subsequent to automatically migrating the at least a portion of data, one or more issues related to a fail-over event of the at least one message-oriented middleware system associated with the one or more detected fail-over-related anomalies. Such an embodiment can additionally include training the one or more machine learning techniques using at least a portion of the one or more identified issues related to the fail-over event.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically predict fail-over of message-oriented middleware systems. These and other embodiments can effectively overcome problems associated with data duplicity.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
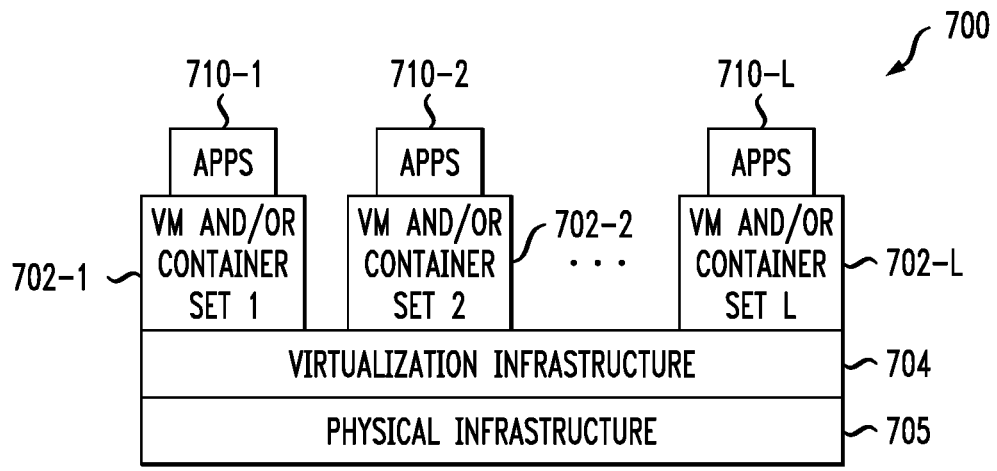
FIGS. 7 and 8 show examples of processing platforms that may be utilized to implement at least a portion of an information processing system in illustrative embodiments.
Figure 8:
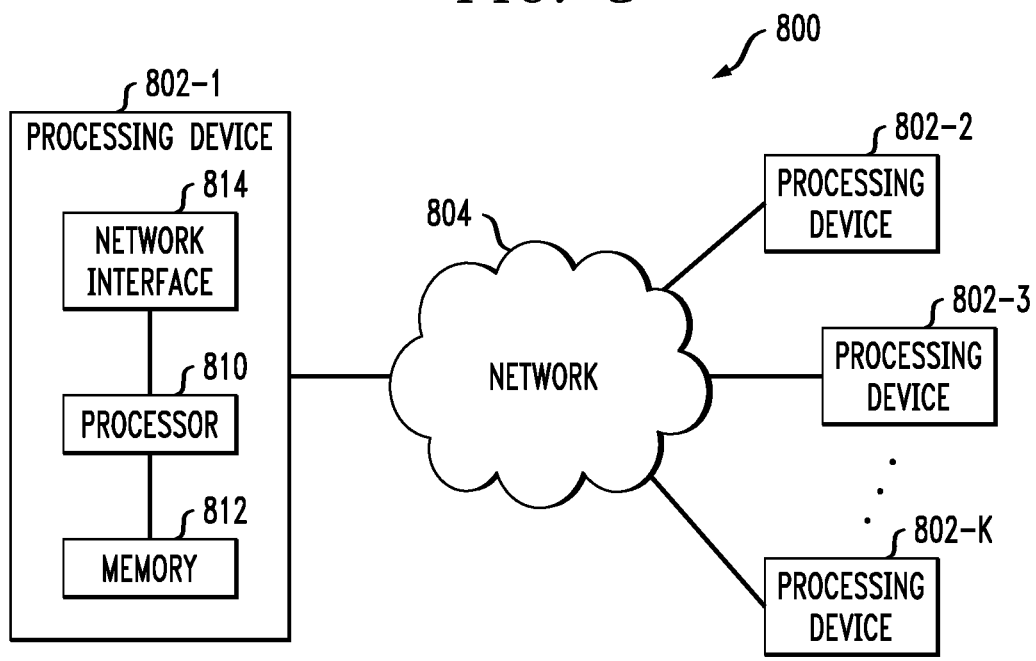

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a CPU, a GPU, a TPU, a microcontroller, an ASIC, a FPGA or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining one or more message-oriented middleware parameter values for at least a portion of multiple message-oriented middleware systems;
detecting one or more fail-over-related anomalies associated with at least one of the multiple message-oriented middleware systems by processing at least a portion of the one or more message-oriented middleware parameter values using one or more machine learning techniques, wherein detecting one or more fail-over-related anomalies comprises predicting at least one middleware outage associated with the at least one of the multiple message-oriented middleware systems based at least in part on (i) results of processing the at least a portion of the one or more message-oriented middleware parameter values using the one or more machine learning techniques and (ii) results of processing, using the one or more machine learning techniques, one or more additional values related to at least one infrastructure upon which at least a portion of the at least one of the multiple message-oriented middleware systems is hosted; and
automatically migrating, based at least in part on the one or more detected fail-over-related anomalies, at least a portion of a set of data associated with the at least one message-oriented middleware system associated with the one or more detected fail-over-related anomalies to at least one of the other of the multiple message-oriented middleware systems, wherein automatically migrating the at least a portion of the set of data comprises synchronizing one or more items of metadata from the at least one message-oriented middleware system associated with the one or more detected fail-over-related anomalies to the at least one of the other of the multiple message-oriented middleware systems, and wherein the one or more items of metadata comprise information indicating where to resume processing, in connection with the at least a portion of the set of data, subsequent to automatically migrating the at least a portion of the set of data to the at least one of the other of the multiple message-oriented middleware systems;
wherein the method is performed by at least one processing device comprising a processor coupled to a memory.

2. The computer-implemented method of claim 1, wherein processing at least a portion of the one or more message-oriented middleware parameter values comprises processing at least a portion of the one or more message-oriented middleware parameter values using at least one isolation forest algorithm.

3. The computer-implemented method of claim 1, further comprising:
processing historical values for the one or more message-oriented middleware parameter values.

4. The computer-implemented method of claim 3, wherein detecting one or more fail-over-related anomalies associated with at least one of the multiple message-oriented middleware systems comprises comparing at least a portion of the one or more obtained message-oriented middleware parameter values to the processed historical values for the one or more message-oriented middleware parameter values.

5. The computer-implemented method of claim 1, further comprising:
automatically identifying, subsequent to automatically migrating the at least a portion of the set of data, one or more issues related to a fail-over event of the at least one message-oriented middleware system associated with the one or more detected fail-over-related anomalies.

6. The computer-implemented method of claim 5, further comprising:
training the one or more machine learning techniques using at least a portion of the one or more identified issues related to the fail-over event.

7. The computer-implemented method of claim 1, wherein obtaining one or more message-oriented middleware parameter values comprises obtaining values pertaining to at least one of central processing unit utilization, memory utilization, storage utilization, input/output utilization, queue depth, channel agent information, and channel connection information.

8. A non-transitory processor-readable storage medium having stored therein program code of one or more software programs, wherein the program code when executed by at least one processing device causes the at least one processing device:
to obtain one or more message-oriented middleware parameter values for at least a portion of multiple message-oriented middleware systems;
to detect one or more fail-over-related anomalies associated with at least one of the multiple message-oriented middleware systems by processing at least a portion of the one or more message-oriented middleware parameter values using one or more machine learning techniques, wherein detecting one or more fail-over-related anomalies comprises predicting at least one middleware outage associated with the at least one of the multiple message-oriented middleware systems based at least in part on (i) results of processing the at least a portion of the one or more message-oriented middleware parameter values using the one or more machine learning techniques and (ii) results of processing, using the one or more machine learning techniques, one or more additional values related to at least one infrastructure upon which at least a portion of the at least one of the multiple message-oriented middleware systems is hosted; and to automatically migrate, based at least in part on the one or more detected fail-over-related anomalies, at least a portion of a set of data associated with the at least one message-oriented middleware system associated with the one or more detected fail-over-related anomalies to at least one of the other of the multiple message-oriented middleware systems, wherein automatically migrating the at least a portion of the set of data comprises synchronizing one or more items of metadata from the at least one message-oriented middleware system associated with the one or more detected fail-over-related anomalies to the at least one of the other of the multiple message-oriented middleware systems, and wherein the one or more items of metadata comprise information indicating where to resume processing, in connection with the at least a portion of the set of data, subsequent to automatically migrating the at least a portion of the set of data to the at least one of the other of the multiple message-oriented middleware systems.

9. The non-transitory processor-readable storage medium of claim 8, wherein processing at least a portion of the one or more message-oriented middleware parameter values comprises processing at least a portion of the one or more message-oriented middleware parameter values using at least one isolation forest algorithm.

10. The non-transitory processor-readable storage medium of claim 8, wherein the program code when executed by the at least one processing device causes the at least one processing device:
to process historical values for the one or more message-oriented middleware parameter values.

11. The non-transitory processor-readable storage medium of claim 10, wherein detecting one or more fail-over-related anomalies associated with at least one of the multiple message-oriented middleware systems comprises comparing at least a portion of the one or more obtained message-oriented middleware parameter values to the processed historical values for the one or more message-oriented middleware parameter values.

12. The non-transitory processor-readable storage medium of claim 8, wherein obtaining one or more message-oriented middleware parameter values comprises obtaining values pertaining to at least one of central processing unit utilization, memory utilization, storage utilization, input/output utilization, queue depth, channel agent information, and channel connection information.

13. The non-transitory processor-readable storage medium of claim 8, wherein the program code when executed by the at least one processing device causes the at least one processing device:
to automatically identify, subsequent to automatically migrating the at least a portion of the set of data, one or more issues related to a fail-over event of the at least one message-oriented middleware system associated with the one or more detected fail-over-related anomalies.

14. The non-transitory processor-readable storage medium of claim 13, wherein the program code when executed by the at least one processing device causes the at least one processing device:
to train the one or more machine learning techniques using at least a portion of the one or more identified issues related to the fail-over event.

15. An apparatus comprising:
at least one processing device comprising a processor coupled to a memory;
the at least one processing device being configured:
to obtain one or more message-oriented middleware parameter values for at least a portion of multiple message-oriented middleware systems;
detect one or more fail-over-related anomalies associated with at least one of the multiple message-oriented middleware systems by processing at least a portion of the one or more message-oriented middleware parameter values using one or more machine learning techniques, wherein detecting one or more fail-over-related anomalies comprises predicting at least one middleware outage associated with the at least one of the multiple message-oriented middleware systems based at least in part on (i) results of processing the at least a portion of the one or more message-oriented middleware parameter values using the one or more machine learning techniques and (ii) results of processing, using the one or more machine learning techniques, one or more additional values related to at least one infrastructure upon which at least a portion of the at least one of the multiple message-oriented middleware systems is hosted; and
to automatically migrate, based at least in part on the one or more detected fail-over-related anomalies, at least a portion of a set of data associated with the at least one message-oriented middleware system associated with the one or more detected fail-over-related anomalies to at least one of the other of the multiple message-oriented middleware systems, wherein automatically migrating the at least a portion of the set of data comprises synchronizing one or more items of metadata from the at least one message-oriented middleware system associated with the one or more detected fail-over-related anomalies to the at least one of the other of the multiple message-oriented middleware systems, and wherein the one or more items of metadata comprise information indicating where to resume processing, in connection with the at least a portion of the set of data, subsequent to automatically migrating the at least a portion of the set of data to the at least one of the other of the multiple message-oriented middleware systems.

16. The apparatus of claim 15, wherein processing at least a portion of the one or more message-oriented middleware parameter values comprises processing at least a portion of the one or more message-oriented middleware parameter values using at least one isolation forest algorithm.

17. The apparatus of claim 15, wherein the at least one processing device is further configured:
to process historical values for the one or more message-oriented middleware parameter values.

18. The apparatus of claim 17, wherein detecting one or more fail-over-related anomalies associated with at least one of the multiple message-oriented middleware systems comprises comparing at least a portion of the one or more obtained message-oriented middleware parameter values to the processed historical values for the one or more message-oriented middleware parameter values.

19. The apparatus of claim 15, wherein obtaining one or more message-oriented middleware parameter values comprises obtaining values pertaining to at least one of central processing unit utilization, memory utilization, storage utilization, input/output utilization, queue depth, channel agent information, and channel connection information.

20. The apparatus of claim 15, wherein the at least one processing device is further configured:
    to automatically identify, subsequent to automatically migrating the at least a portion of the set of data, one or more issues related to a fail-over event of the at least one message-oriented middleware system associated with the one or more detected fail-over-related anomalies.

\* \* \* \* \*

UNITED STATES PATENT AND TRADEMARK OFFICE
CERTIFICATE OF CORRECTION

| | | |
|---|---|---|
| PATENT NO. | : 11,940,886 B2 | Page 1 of 1 |
| APPLICATION NO. | : 17/579058 | |
| DATED | : March 26, 2024 | |
| INVENTOR(S) | : Madhanamohana Reddy Gandluri et al. | |

It is certified that error appears in the above-identified patent and that said Letters Patent is hereby corrected as shown below:

In the Claims

In Claim 15, Column 18, Lines 5-6, replace:
"detect one or more fail-over-related anomalies associated with at least one of the multiple message-"
With:
-- to detect one or more fail-over-related anomalies associated with at least one of the multiple message- --

Signed and Sealed this
Eleventh Day of March, 2025

Coke Morgan Stewart
*Acting Director of the United States Patent and Trademark Office*